Patented Jan. 15, 1952

2,582,257

UNITED STATES PATENT OFFICE 2,582,257

ESTERS AND METHODS FOR OBTAINING THE SAME

Eldon M. Jones, Grosse Pointe Woods, Mich., assignor to Parke, Davis & Company, Detroit, Mich., a corporation of Michigan No Drawing. Application September 15, 1950, Serial No. 185,165

5 Claims. (Cl. 260—404)

This invention relates to esters of a basically substituted aliphatic acid, their acid addition salts, and to methods for obtaining the same. More particularly, the invention relates to the group of α-n-hexylamino-substituted octanoic acid esters having, in the free base form, the formula,

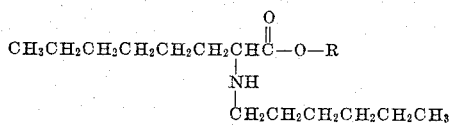

where R is a methyl, ethyl, isopropyl or n-butyl radical.

In accordance with the invention, α-n-hexylamino-substituted octanoic acid esters having the above formula are produced by reacting n-hexylamine with a lower alkyl ester of an α-halogenated octanoic acid of formula,

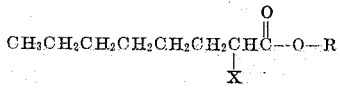

where X is a halogen atom and R has the same significance as given above. In carrying out the reaction, it is preferable to employ at least two moles of n-hexylamine or one mole of n-hexylamine with at least one mole of a strongly basic substance such as an alkaline earth metal carbonate, a tertiary organic amine and the like. The temperature of the reaction is not particularly critical and can vary from about 10° to 100° C. The reaction can be carried out in the presence or absence of an inert organic solvent such as a lower aliphatic alcohol, ether, ester, ketone, glycol, hydrocarbon, halogenated hydrocarbon and the like.

The lower alkyl esters of α-halogenated octanoic acids used as starting materials need not be in pure form. For example, the crude esters obtained by the reaction of a lower aliphatic alcohol with an α-halogenated octanoyl halide of the formula,

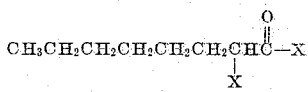

where X is a halogen atom, can be used without further purification. In carrying out the reaction the α-halogenated octanoyl halide is added slowly to an excess of the alcohol to be esterified, either in the presence or absence of an inert, organic diluent such as ether, dioxane, petroleum ether, benzene, toluene, and the like. After this addition is complete and the spontaneous reaction has subsided, the reaction may be completed by the external application of heat, but in most instances this will be unnecessary. It is equally satisfactory to reverse the order given above for the mixing of the reactants; i. e., an excess of the alcohol to be esterified can be added to the α-halogenated aliphatic acyl halide, either in the presence or absence of an inert organic diluent, as above.

The α-n-hexylamino-substituted octanoic acid esters of the invention are basic in nature and form acid addition salts with organic and inorganic acids such as hydrochloric, hydrobromic, hydriodic, sulfuric, phosphoric, sulfamic, tartaric, oxalic, benzoic, citric, picric, acetic, maleic, and the like acids. The free bases, as well as their non-toxic acid addition salts, are of particular value in the alleviation of pain. Their analgetic activity is of a high degree, exceeding even that of morphine. They may be administered either orally or parenterally.

The invention is illustrated by the following examples:

Example 1

A mixture consisting of 25.1 g. of ethyl 2-bromoctanoate, 20.2 g. of n-hexylamine, and 100 ml. of absolute ethanol is allowed to stand at room temperature for ten days and then refluxed for twenty-one hours. After removal of the ethanol by distillation, the residue is diluted with 1.5 l. of petroleum ether. The solution is filtered and the petroleum ether filtrate is evaporated to a volume of 500 ml. Upon treatment of the petroleum ether concentrate with 20% aqueous hydrochloric acid, the system separates into three layers, all of the color being in the middle, oily layer. This three phase system is extracted twice with petroleum ether and these extracts discarded. The remaining two phase system is extracted twice with ether, after which the combined ether extracts are washed with water, with 10% aqueous sodium hydroxide, once more with water and then dried over anhydrous potassium carbonate. Removal of the ether from the dried solution by distillation and vacuum distillation of the residue remaining gives pure ethyl α-n-hexylaminooctanoate which boils at 152-6° C. at 6 mm. and has the formula,

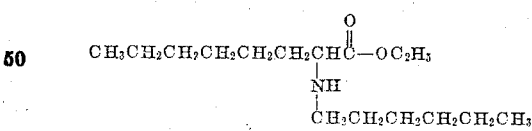

5.42 g. of ethyl α-n-hexylaminooctanoate is added to 2.08 g. of malonic acid dissolved in ethanol and the solution evaporated to dryness in vacuo. The residual and malonate salt of ethyl α-n-hexylaminooctanoate is purified by recrystallization from a mixture of ether and isopropanol; M. P. 94–6° C.

A dry petroleum ether solution of 3.1 g. of ethyl α-n-hexylaminooctanoate is treated with an excess of gaseous hydrogen chloride. The hydrochloride salt of ethyl α-n-hexylaminooctanoate which separates is purified by recrystallization from a mixture of petroleum ether and ethyl acetate.

Example 2

48.2 g. of α-bromoctanoyl chloride is added dropwise to 25 ml. of isopropanol and the resulting solution stirred for thirty minutes. 20 g. of anhydrous sodium carbonate is added to the reaction mixture followed by 30 ml. of n-hexylamine. After refluxing for one hour the solution is diluted, first, with an equal volume of water, then with a like volume of petroleum ether. The organic layer is separated and shaken with 20% aqueous hydrochloric acid which causes the system to separate into three layers. The middle layer, consisting of the desired water-insoluble hydrochloride, is separated and basified with aqueous ammonia. The resulting alkaline solution is extracted with ether, the ether extract washed with water and dried over anhydrous potassium carbonate. The ether is evaporated and the residual oil distilled in vacuo to obtain the desired isopropyl α-n-hexylaminooctanoate, B. P. 130–40° C. at 1 mm., which has the formula,

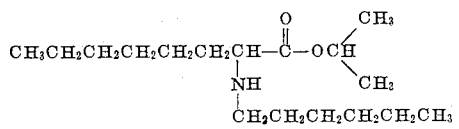

A dry petroleum ether solution of 5 g. of isopropyl α-n-hexylaminooctanoate is treated with an excess of gaseous hydrogen chloride. The initially liquid hydrochloride salt of isopropyl α-n-hexylaminooctanoate which separates is crystallized and purified by recrystallization from petroleum ether; M. P. 75–7° C.

Example 3

43.5 g. of α-bromoctanoyl chloride is added dropwise to 20 ml. of methanol and the resulting solution stirred for thirty minutes. 20 g. of anhydrous sodium carbonate is added to the reaction mixture followed by 20 ml. of n-hexylamine. After refluxing for two hours the solution is diluted, first, with an equal volume of water, then with a like volume of petroleum ether. The organic layer is separated and shaken with 20% aqueous hydrochloric acid which causes the system to separate into three layers. The middle layer, consisting of the water-insoluble hydrochloride of the desired base is separated and basified with aqueous ammonia. The alkaline solution is extracted with ether, the ether extract washed with water and dried over anhydrous potassium carbonate. The ether is removed by distillation and the residual oil distilled in vacuo to obtain the desired methyl α-n-hexylaminooctanoate, B. P. 149–54° at 8 mm., which has the formula,

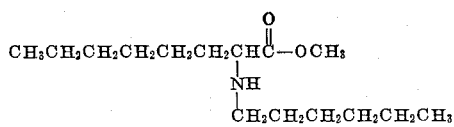

A dry petroleum ether solution of 5 g. of methyl α-n-hexylaminooctanoate with an excess of gaseous hydrogen chloride. The white hydrochloride salt of methyl α-n-hexylaminooctanoate which separates is collected and purified by recrystallization from a mixture of petroleum ether and ethyl acetate; M. P. 88–97° C.

Example 4

43.5 g. of α-bromoctanoyl chloride is added dropwise to 35 ml. of n-butanol and the resulting solution stirred for thirty minutes. 20 g. of anhydrous sodium carbonate is added to the reaction mixture followed by 20 ml. of n-hexylamine. After refluxing for two hours the solution is diluted, first, with an equal volume of water, then with a like volume of petroleum ether. The organic layer is separated and shaken with 20% aqueous hydrochloric acid which causes the system to separate into three layers. The middle layer, consisting of the water-insoluble hydrochloride of the desired base, is separated and basified with aqueous ammonia. The alkaline solution is extracted and basified with aqueous ammonia. The alkaline solution is extracted with ether, the ether extract washed with water and dried over anhydrous magnesium sulfate. The ether is evaporated to obtain an oil which on vacuum distillation yields the desired n-butyl α-n-hexylaminooctanoate of formula,

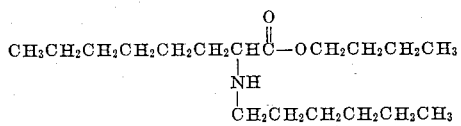

5 g. of n-butyl α-n-hexylaminooctanoate is dissolved in the stoichiometric quantity of 2N phosphoric acid and the reaction mixture evaporated to dryness in vacuo. The residual white phosphate salt of n-butyl α-n-hexylaminooctanoate is purified by recrystallization from aqueous ethanol.

A dry petroleum ether solution of 3 g. of n-butyl α-n-hexylaminooctanoate is treated with excess gaseous hydrogen chloride. The hydrochloride salt of n-butyl α-n-hexylaminooctanoate which separates is purified by recrystallization from a mixture of ether and ethyl acetate.

What I claim is:

1. A compound of the class consisting of a free base and its acid addition salts, said free base having the formula,

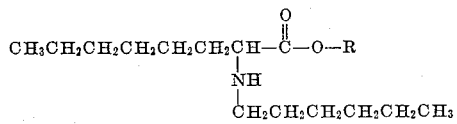

where R is a member of the class consisting of methyl, ethyl, isopropyl and n-butyl radicals.

2. The hydrochloride salt of ethyl α-n-hexylaminooctanoate.

3. The hydrochloride salt of isopropyl α-n-hexylaminooctanoate.

4. The hydrochloride salt of methyl α-n-hexylaminooctanoate.

5. The hydrochloride salt of n-butyl α-n-hexylaminooctanoate.

ELDON M. JONES.

REFERENCES CITED

The following references are of record in the file of this patent:

UNITED STATES PATENTS

| Number | Name | Date |
| --- | --- | --- |
| 1,947,650 | Keller | Feb. 20, 1934 |
| 2,109,929 | Rigby | Mar. 1, 1938 |